(12) United States Patent
Suzuki et al.

(10) Patent No.: US 7,161,703 B2
(45) Date of Patent: Jan. 9, 2007

(54) IMAGE PROCESSING SYSTEM HAVING A STORAGE SECTION BEING ACCESSED DIRECTLY

(75) Inventors: Minoru Suzuki, Yokohama (JP); Kuniyoshi Takano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/283,207

(22) Filed: Oct. 30, 2002

(65) Prior Publication Data

US 2004/0085577 A1 May 6, 2004

(51) Int. Cl.
*G06F 15/00* (2006.01)
*G06K 15/00* (2006.01)

(52) U.S. Cl. .................................. 358/1.16; 358/448
(58) Field of Classification Search ............. 358/411, 358/1.15, 1.16, 404, 410, 412, 444, 445, 358/446, 455, 504; 711/106, 167; 713/500, 713/501, 502
See application file for complete search history.

(56) References Cited

U.S. PATENT DOCUMENTS

RE37,282 E * 7/2001 Smitt ........................ 358/474

6,486,969 B1 * 11/2002 Maruyama ................. 358/1.15
6,816,930 B1 * 11/2004 Yoshida ........................ 710/62
6,947,181 B1 * 9/2005 Sato ........................... 358/400

FOREIGN PATENT DOCUMENTS

| JP | 10-003784 A | 1/1998 |
| JP | 2001-022692 A | 1/2001 |
| JP | 2001-318828 A | 11/2001 |

* cited by examiner

*Primary Examiner*—Gabriel Garcia
(74) *Attorney, Agent, or Firm*—Foley & Lardner LLP

(57) ABSTRACT

An image processing system according to the present invention is provided with a first switch control section configured to select clocks in accordance with an image processing mode, from among a plurality of clocks a first clock generating section generates for operating an image processing section, a storage section used for image processing, and a second clock generating section which enables an operation to be performed based on clocks faster than those used in the image processing mode, in accordance with an operation of the storage section. When direct access to the storage section is externally executed in an image processing mode, the image processing system causes a second switch control section to switch clocks from the clocks which are as fast as those used in the image processing mode to the clocks which enable an operation to be executed in accordance with the operation of the storage section.

8 Claims, 11 Drawing Sheets

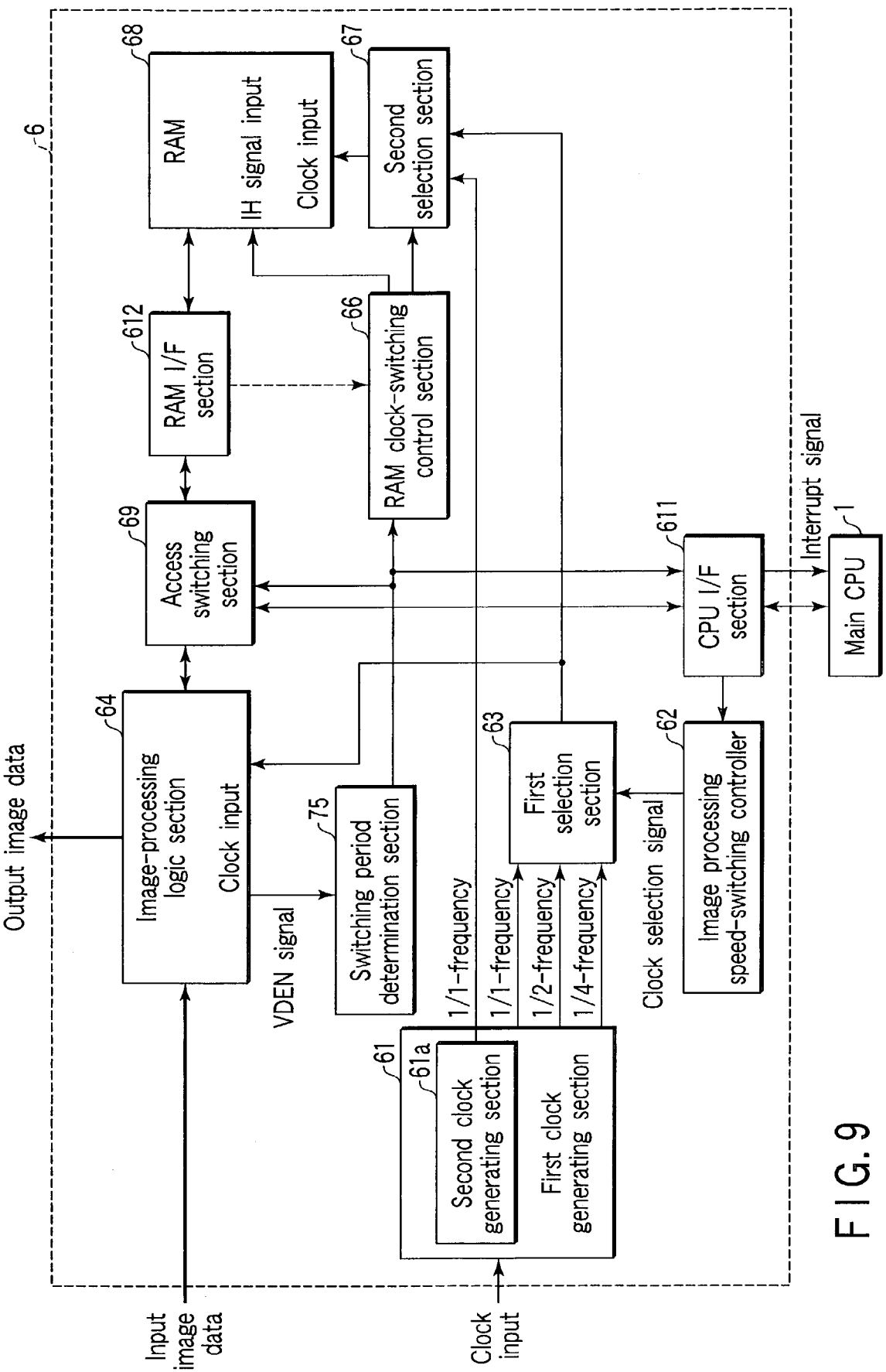
F I G. 9

IMAGE PROCESSING SYSTEM HAVING A STORAGE SECTION BEING ACCESSED DIRECTLY

BACKGROUND OF THE INVENTION

1. Field of the Invention

The present invention relates to an image processing system, more particularly to an image processing system wherein a storage section is accessed directly by an external controller in an image processing mode in which to execute image processing.

2. Description of the Related Art

An image forming apparatus, such as a digital color copying machine, is provided with an image processing section configured to process images read from a scanner. An example of the image processing section is an application specific integrated circuit (ASIC). The ASIC incorporates a RAM to temporarily store data required for image processing. Normally, the RAM operates based on equal clocks as an image-processing logic section provided inside the ASIC. The clocks on which to operate the image-processing logic section may vary in frequency in accordance with an image processing mode selected. For example, the frequency of the clocks in a color image processing mode may be half that of the clocks used in a monochrome image processing mode because of the sensitivity difference between CCDs. As can be seen from this, when the clocks based on which to operate the components of the ASIC change, the frequency of the clocks supplied to the RAM changes accordingly. That is, in the case of an image processing mode in which the clocks are slow in terms of the operation of the RAM, the RAM operates in synchronism with those clocks. If the RAM is directly accessed by an external controller of the ASIC in the image processing mode, the clocks based on which to operate the RAM are slowed in accordance with that image processing mode. Therefore, the controller requires a long access time, and the efficiency of the entire system including the ASIC is inevitably low.

BRIEF SUMMARY OF THE INVENTION

There is a need for an image processing system whose overall system efficiency, including the efficiency of its image processing section, is improved by switching over to fast clocks and supplying them to a storage section, when an element not included in the image processing section directly accesses the storage section in an image processing section wherein image processing is executed by use of slow clocks in terms of the operation of the storage section.

According to one aspect of the present invention, an image processing system comprises: an image processing section configured to execute image processing in an image processing mode that accords with input image data; a storage section configure to be used for the image processing by the image processing section a first clock generating section configured to generate a plurality of clocks based on which the image processing section and the storage section operate in the image processing mode; a first switch control section configured to select clocks which accords with the image processing mode from the plurality of clocks and use selected clocks for the image processing section and the storage section, which operate on equal clocks; a second clock generating section configured to generate clocks which are faster than the clocks generated by the first clock generating section in accordance with an operation of the storage section; a direct access mode setting section configured to determine settings for a direct access mode in which direct access to the storage section is externally executed; and a second switch control section configured to switch the clocks for operating the storage section from the clocks selected by the first switch control section to the clocks generated by the second clock generating section when the direct access mode setting section sets the direct access mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 schematically illustrates the ASIC employed in the fifth embodiment.

DETAILED DESCRIPTION OF THE INVENTION

Embodiments of the present invention will now be described with reference to the accompanying drawings. In connection with one embodiment, reference will be made to a case where the present invention is applied to an ASIC which a digital color copying machine employs for image processing.

First Embodiment

Figure 1:
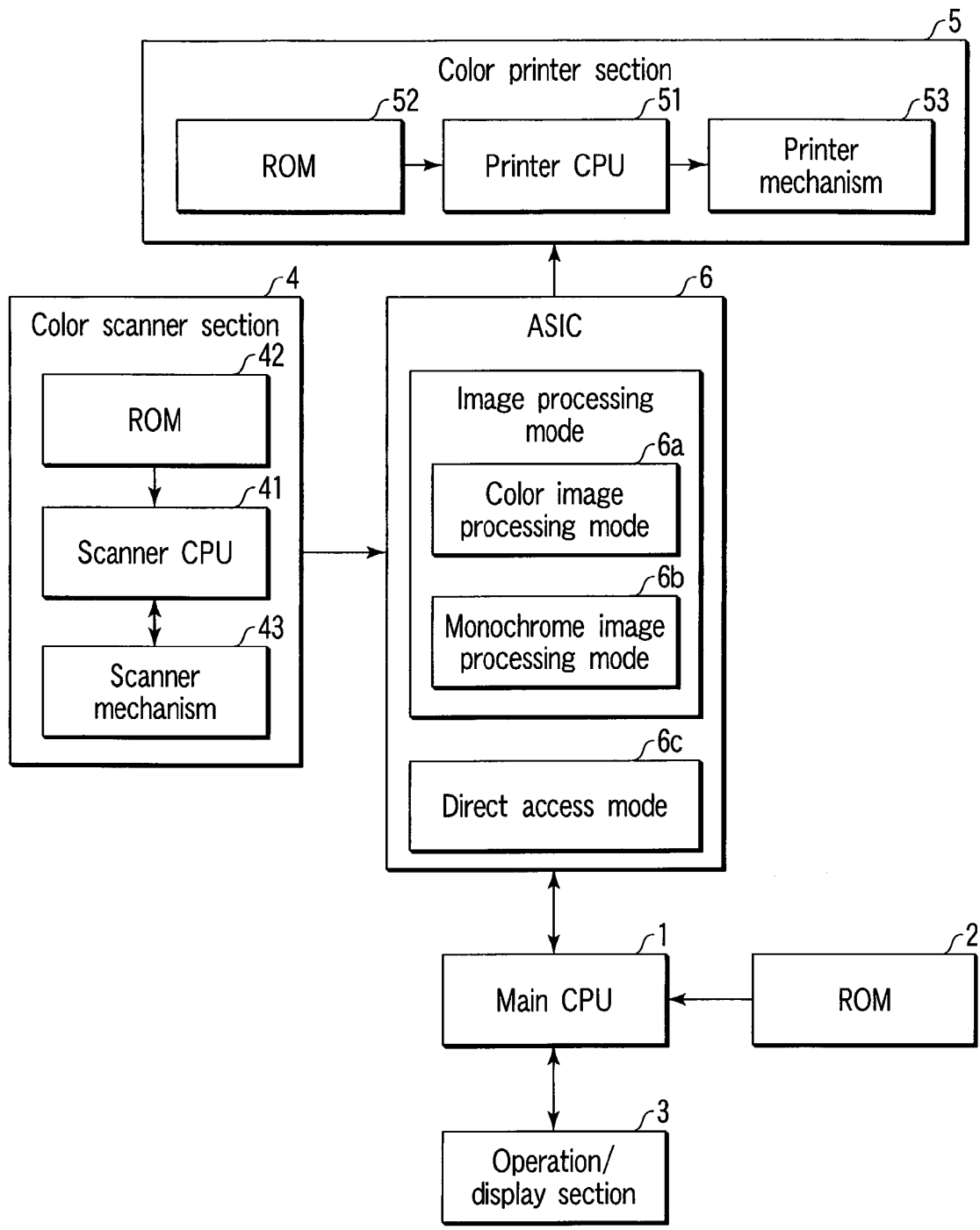
FIG. 1 is a diagram illustrating a schematic configuration of a digital color copying machine according to the first embodiment of the present invention.

FIG. 1 is a diagram schematically illustrating a digital color copying machine. Roughly speaking, the digital color copying machine comprises a main CPU 1, a ROM 2, a display/operation section 3, a color scanner section 4, a color printer section 5 and an ASIC 6.

The main CPU 1 controls the entirety of the digital color copying machine by running a control program. The ROM 2 stores the program run by the main CPU 1. Under the control by the main CPU 1, the operation/display section 3 receives a user's instruction from its operation portion and displays information the user requires in its display portion.

The color scanner section 4 includes a scanner CPU 41, a ROM 42 and a scanner mechanism 43. The scanner CPU 41 controls the entirety of the color scanner section 4. The ROM 42 stores a control program run by the scanner CPU 41, etc. The scanner mechanism 43 is provided with an optical portion configured to read or scan a document, a movement mechanism configured to move the optical portion along a document table, four line sensors configured to convert a document image, guided thereto by the optical portion, into image signals, and an image correction section configured to correct signals output from the line sensors.

The type of image read by the color scanner section 4 is based on a user's instruction entered from the operation/display section 3. When the instruction indicates a color document, a color image is read.

When the instruction indicates a monochrome document, a monochrome image is read. The read image is output to the ASIC 6.

The color printer section 5 includes a printer CPU 51, a ROM 52 and a printer mechanism 53. The printer CPU 51 controls the entirety of the color printer section 5. The ROM 52 stores a control program run by the printer CPU 51, etc. The printer mechanism 53 executes printing on the basis of image data (yellow [Y], magenta [M], cyan [C] and black [K]) output from the ASIC 6. The printer of each color comprises: a photosensitive drum; a charging unit which charges the surface of the photosensitive drum; an exposure unit including a semiconductor laser oscillator and forming an electrostatic latent image on the photosensitive drum, the light emission by the semiconductor laser oscillator being controlled based on the image data (Y, M, C, K) of each color; a developing unit which visualizes the electrostatic latent image on the photosensitive drum by forming a toner image; a transport mechanism which transports a sheet serving as an image formation medium; a transfer unit which transfers the toner image from the photosensitive drum onto the sheet transported by the transport mechanism; and a fixing unit which thermally fixes the toner image transferred to the sheet by the transfer unit.

Figure 2:
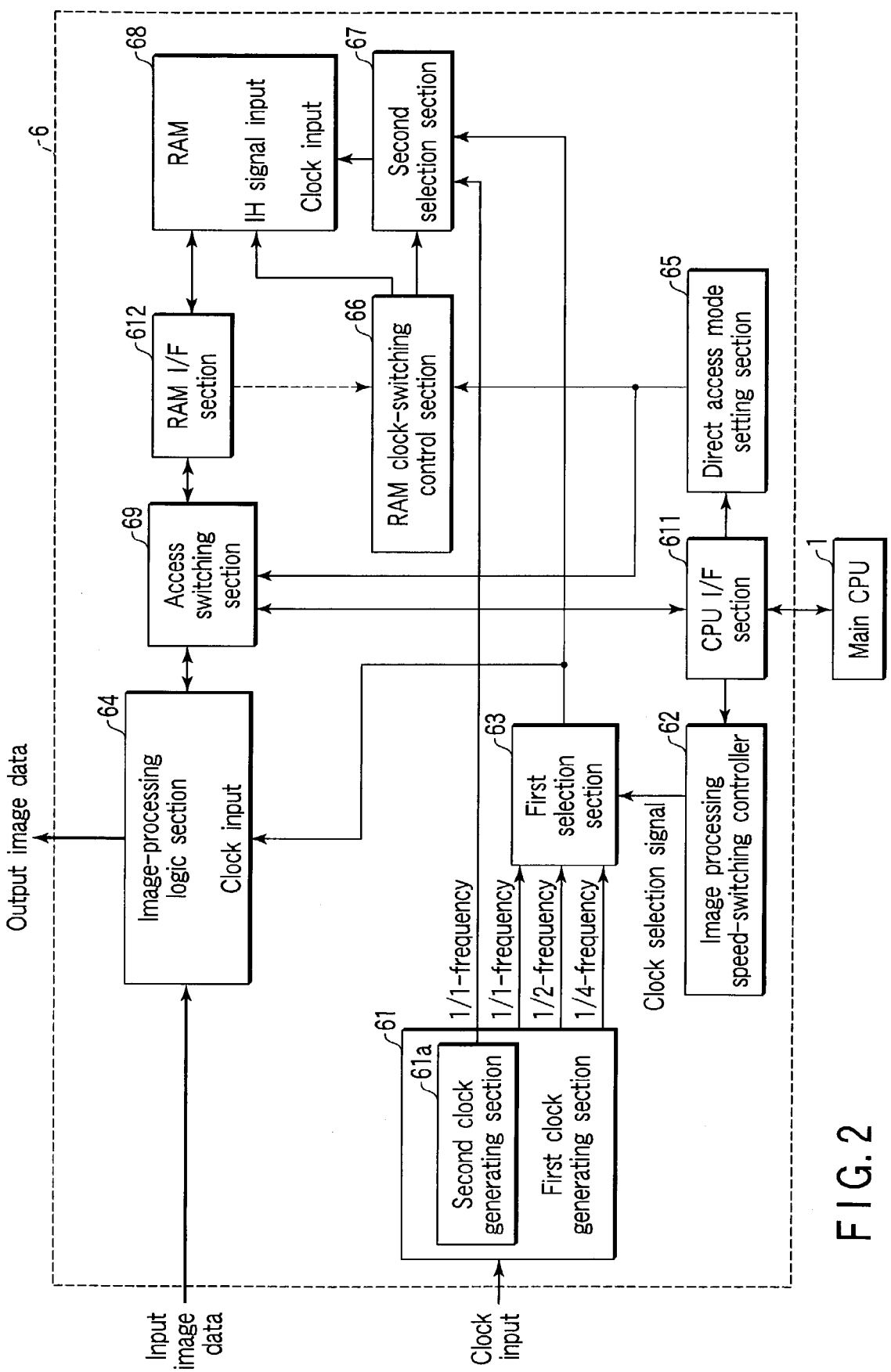
FIG. 2 schematically illustrates the ASIC employed in the first embodiment of the present invention.

Next, the ASIC 6 will be described. FIG. 2 is a diagram showing a schematic configuration of the ASIC 6. Based on an instruction received from the operation/display section 3, the ASIC 6 processes a color image from the color scanner section 4 in the color image processing mode 6a, and processes a monochrome image in the monochrome image processing mode 6b. The processed images are output to the color printer section 5.

Roughly speaking, the ASIC 6 includes a first clock generating section 61, a second clock generating section 61a, an image processing speed-switching controller 62, a first selection section 63, an image-processing logic section 64, a direct access mode setting section 65, a RAM clock-switching control section 66, a second selection section 67, a RAM 68, an access switching section 69, a CPU interface (I/F) section 611, and a RAM interface (I/F) section 612.

The main CPU 1 is connected to the image processing speed-switching controller 62, direct access mode setting section 65 and access switching section 69 of the ASIC 6 through the CPU I/F section 611.

The first clock generating section 61 will be described. Based on the frequency of a clock supplied from an external element of the ASIC 6, the first clock generating section 61 generates clocks of different frequencies. For example, as shown in FIG. 2, the first clock generating section 61 generates the following clocks: a ⅟₁-frequency clock having the same frequency as an input clock; a ½-frequency clock having a frequency which is ½ of that of the input clock; and a ¼-frequency clock having a frequency which is ¼ of that of the input clock. As can be seen from this, the clock generating section 61 generates two kinds of clocks, namely, clocks which are as fast as input clocks, and different-speed clocks which are slower than the input clocks. The generated clocks are supplied to the first selection section 63.

The second clock generating section 61a will be described. In the present embodiment, the second clock generating section 61a is provided in the first clock generating section 61. An input ⅟₁-frequency clock is used as a clock that is fastest in terms of the operation of the RAM 68. The input ⅟₁-frequency clock is therefore supplied to the second selection section 67. Where the clocks of the RAM 68 and the main CPU 1 are faster than the clocks used in the image processing mode, clocks faster than the input clocks may be generated. The generated clocks are supplied to the second selection section 67.

Under the control by the main CPU 1, the image processing speed-switching controller (first switch control section) 62 outputs a clock selection signal to the first selection section 63. The clock selection signal is generated based on which image processing mode is selected for the image-processing logic section 64 to execute processing. For example, the clock generation signal is generated in such a manner that the fast ⅟₁-frequency clock is selected in the monochrome image processing mode 6b and the slow ½-frequency clock is selected in the color image processing mode 6a.

On the basis of the clock selection signal, the first selection section 63 selects output clocks, which are to be used for operating the image-processing logic section 64 and the RAM 68, from the ⅟₁-frequency, ½-frequency and ¼-frequency clocks received from the clock generating section 61. The clocks having the clocks selected in this manner will be hereinafter referred to as "image processing clocks." The clocks having the selected frequency are supplied to the second selection section 67.

The image-processing logic section 64 (i.e., an image processing section) executes image processing for the input image data (e.g., color image data or monochrome image data) supplied from the color scanner section 4, and outputs the processed data to the color printer section 5 as output image data. The image-processing logic section 64 processes the input image data, using the RAM 68 through the access switching section 69 and the RAM I/F 612.

The direct access mode setting section 65 sets a direct access mode in which the main CPU 1 directly accesses the RAM 68. When the direct access mode is set, a signal indicating this state is supplied to the RAM clock-switching control section 66, the access switching section 69, etc.

The RAM clock-switching control section 66 (the second switch control section) generates a RAM clock selection signal on the basis of signals input from the direct access mode setting section 65. The RAM clock selection signal is used for selecting clocks supplied to the RAM 68. For example, the RAM clock selection signal is "0" in the case of the image processing mode, and is "1" in the case of the direct access mode. The RAM clock-switching control section 66 generates an inhibit (IH) signal that disables the clocks supplied from the second selection section 67 to the RAM 68. The IH signal is supplied to the RAM 68. For example, the IH signal disables the clocks supplied to the RAM 68 when the RAM clock selection signal is "1", and enables the clocks when the RAM clock selection signal is "0." The IH signal is supplied to the RAM 68 for the following reason: when the clocks supplied from the second selection section 67 to the RAM 68 are switched, and the RAM 68 is accessed immediately thereafter, the clocks are inevitably unstable and access to the RAM 68 in this situation may result in damage to data or erasing thereof. In other words, when the mode is switched from the image processing mode to the direct access mode 6c, the contents in the RAM 68 are protected by outputting the IH signal and thereby disabling the clocks supplied to the RAM 68 for a predetermined period of time (which period will be referred to as a "RAM clock switching period").

The second selection section 67 is supplied with $\frac{1}{1}$-frequency clocks and clocks whose frequency is selected by the first selection section 63. The second selection section 67 is also supplied with the RAM clock selection signal. On the basis of the RAM clock selection signal, the second selection section 67 selects clocks and outputs them to the RAM 68. In each image processing mode, the second selection section 67 outputs clocks whose frequency is selected by the first selection section 63 and supplies them to the RAM 68. When the RAM clock selection signal indicates the direct access mode 6c, the second selection section 67 selects the $\frac{1}{1}$-frequency clocks supplied from the second clock generating section 61a. In this manner, in each image processing mode, the second selection section 67 supplies the RAM 68 with image processing clocks whose frequency is suitable to the processing mode, and in the direct access mode, the second selection section 67 supplies the RAM 68 with clocks which are fastest in terms of the operation of the RAM 68. The clocks selected by the second selection section 67 and supplied to the RAM 68 will be hereinafter referred to as "RAM clocks."

The RAM (storage section) 68 operates on the RAM clocks. The RAM 68 is provided with a work area the image-processing logic section 64 uses for image processing, and an area used for storing data required for image processing when this data is fetched externally.

The access switching section 69 is connected to the RAM 68 by way of the RAM I/F section 612, to the image-processing logic section 64 directly, to the main CPU 1 by way of the CPU I/F section 611, and to the direct access mode setting section 65. Controlled by the direct access mode setting section 65, the access switching section 69 connects the image-processing logic section 64 and the RAM 68 to each other in each image processing mode, and connects the main CPU 1 and the RAM 68 to each other in the direct access mode 6c. In other words, the RAM 68 is connected to the image-processing logic section 64 in each image processing mode, and is connected to the main CPU 1 in the direct access mode 6c.

Figure 3:
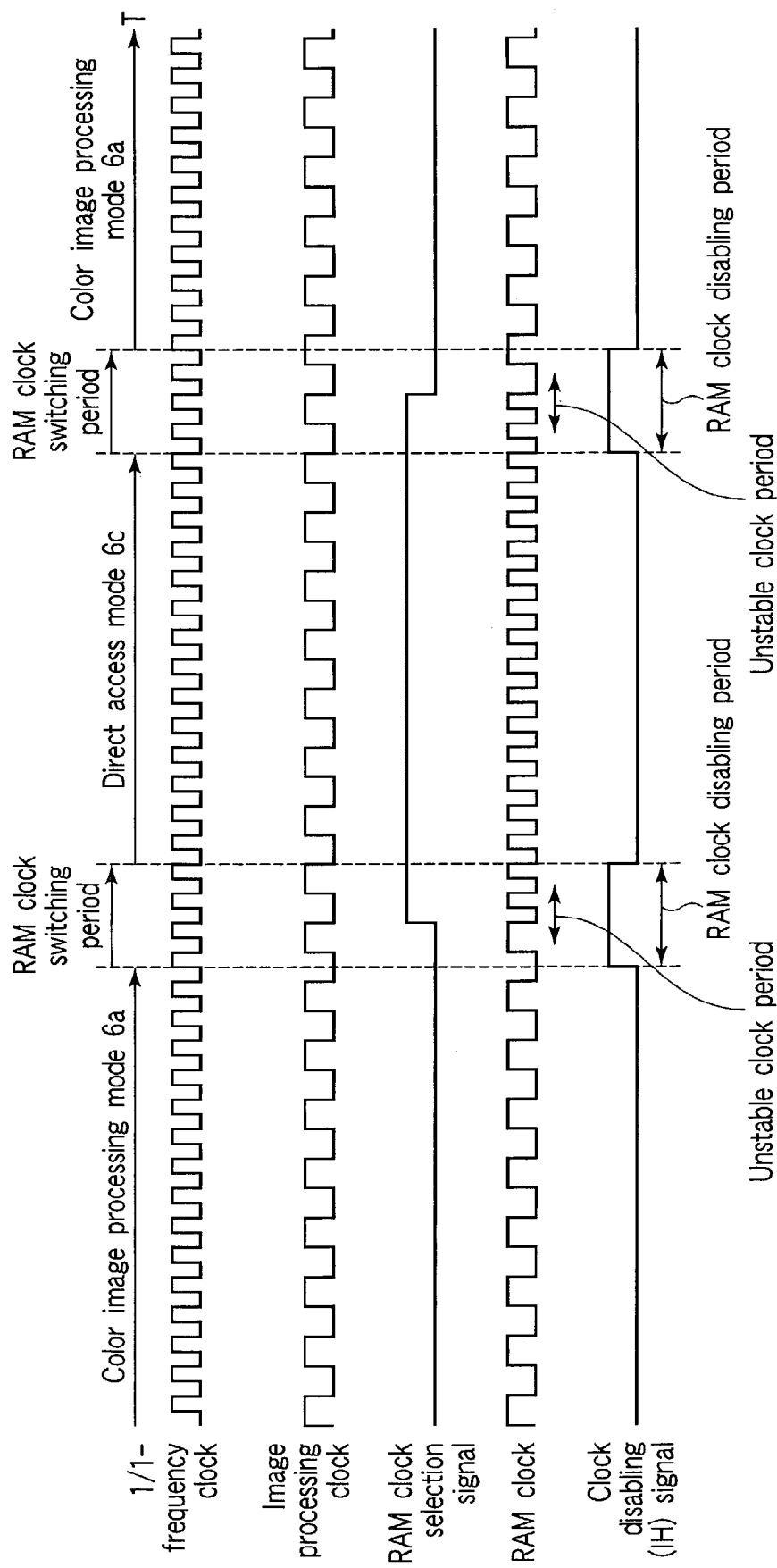
FIG. 3 is a timing chart illustrating the first embodiment.

An operation of the RAM clock-switching control section 66 of the ASIC having the above configuration will be described based on the timing chart shown in FIG. 3. In FIG. 3, time (T) is plotted against the abscissa, and FIG. 3 illustrates the timings of signals. The signals FIG. 3 shows from top to bottom are a $\frac{1}{1}$-frequency clock, an image processing clock, a RAM clock selection signal, a RAM clock, and an IH signal. The timing chart illustrates how the timings are when the direct access mode is selected in the color image processing mode 6a and is then returned to the color image processing mode 6a.

In the color image processing mode 6a, the second selection section 67 is supplied with both a $\frac{1}{1}$-frequency clock and a $\frac{1}{2}$-frequency clock. Since the RAM clock selection signal is "0" then, the $\frac{1}{2}$-frequency clock serves as the RAM clock. On the other hand, since the IH signal is "0", the clocks supplied to the RAM 68 are enabled. In this manner, the image-processing logic section 64 operates on the $\frac{1}{2}$-frequency clocks, and when color image data is being processed, the RAM 68 operates on the same clocks and performs operations, such as temporal storage of data.

When the direct access mode 6c is selected in the color image processing mode, the RAM clock-switching control section 66 raises the level of the IH signal to "1", thereby disabling the $\frac{1}{2}$-frequency clocks supplied to the RAM 68. The IH signal is kept at "1" during the RAM clock switching period, and falls to "0" at the end of the RAM clock switching period. On the other hand, the RAM clock selection signal supplied to the second selection section 67 rises during the RAM clock switching period, the second selection section 67 selects $\frac{1}{1}$-frequency clocks and supplies them to the RAM 68.

At the end of the RAM clock switching period, the clocks supplied to the RAM 68 are clocks of $\frac{1}{1}$ frequency. Therefore, the main CPU 1 can execute direct access on the basis of clocks that are fastest in terms of the operation of the RAM 68, so that the main CPU 1 can read data from the RAM 68 or write data therein.

At the end of the direct access mode 6c, the RAM clock selection signal and the IH signal are switched in a substantially similar manner. More specifically, at the end of the direct access, the IH signal is temporarily switched from "0" to "1", thereby disabling the clocks supplied to the RAM 68. Then, the RAM clock selection signal is switched from "1" to "0" so that $\frac{1}{2}$-frequency clocks used in the color image processing mode are supplied to the RAM 68. At the end of the RAM clock-disabled period, the IH signal is switched from "1" to "0" so as to enable the clocks supplied to the RAM 68. In this manner, the color image processing mode is set again, and the image-processing logic section 64 executes processing with respect to input color image data.

As described above, the ASIC 6 can select either the clocks which have such a frequency as used in the image processing mode or the clocks which are fastest in terms of the operation of the RAM 68 and supplies the selected clocks to the RAM 68, when the direct access mode 6c is selected in the image processing mode. For example, when the direct access mode 6c is set in the color image processing mode 6a wherein images are processed on $\frac{1}{2}$-frequency clocks, the clocks supplied to the RAM 68 are switched to clocks having the $\frac{1}{1}$ frequency, and the main CPU 1 is allowed to access the RAM 68. Therefore, the RAM 68 can be operated based on fast clocks in the direct access mode 6c even though it is operated in the image processing mode based on clocks that are slow in terms of the operation. As a result, the processing efficiency of the entire digital color copying machine can be enhanced, including that of the ASIC 6.

When the direct access mode 6c is selected in the image processing mode and the clocks to be supplied to the RAM 68 are switched, the clocks that are supplied to the RAM 68 in the RAM clock switching period can be disabled by use of the IH signal. Since the RAM 68 does not operate during this RAM clock switching period, the main CPU 1 does not access it. In this manner, the main CPU 1 does not access the RAM 68 when the clocks supplied to the RAM 68 are unstable. Hence, the contents in the RAM 68 are not damaged, nor are they erased.

Second Embodiment

The second embodiment will be described. Similar or corresponding structural elements to those described in connection with the foregoing embodiment will be denoted by the same reference numerals as used above, and a detailed description of such structural elements will be omitted.

The second embodiment differs from the first embodiment in that the signals supplied from the direct access mode setting section 65 to the RAM clock-switching control section 66 are access signals indicating an access period in which the main CPU 1 actually accesses the RAM 68. The RAM clock-switching control section 66 switches these signals at the timing shown in FIG. 4. The period in which the main CPU 1 actually accesses the RAM 68 in the direct access mode 6c will be referred to as a RAM clock-enabled period (access occurrence period). The RAM clock-switching control section 66 performs switching in such a manner that $\frac{1}{1}$-frequency clocks are supplied to the RAM 68 in this RAM clock-enabled period.

Figure 4:
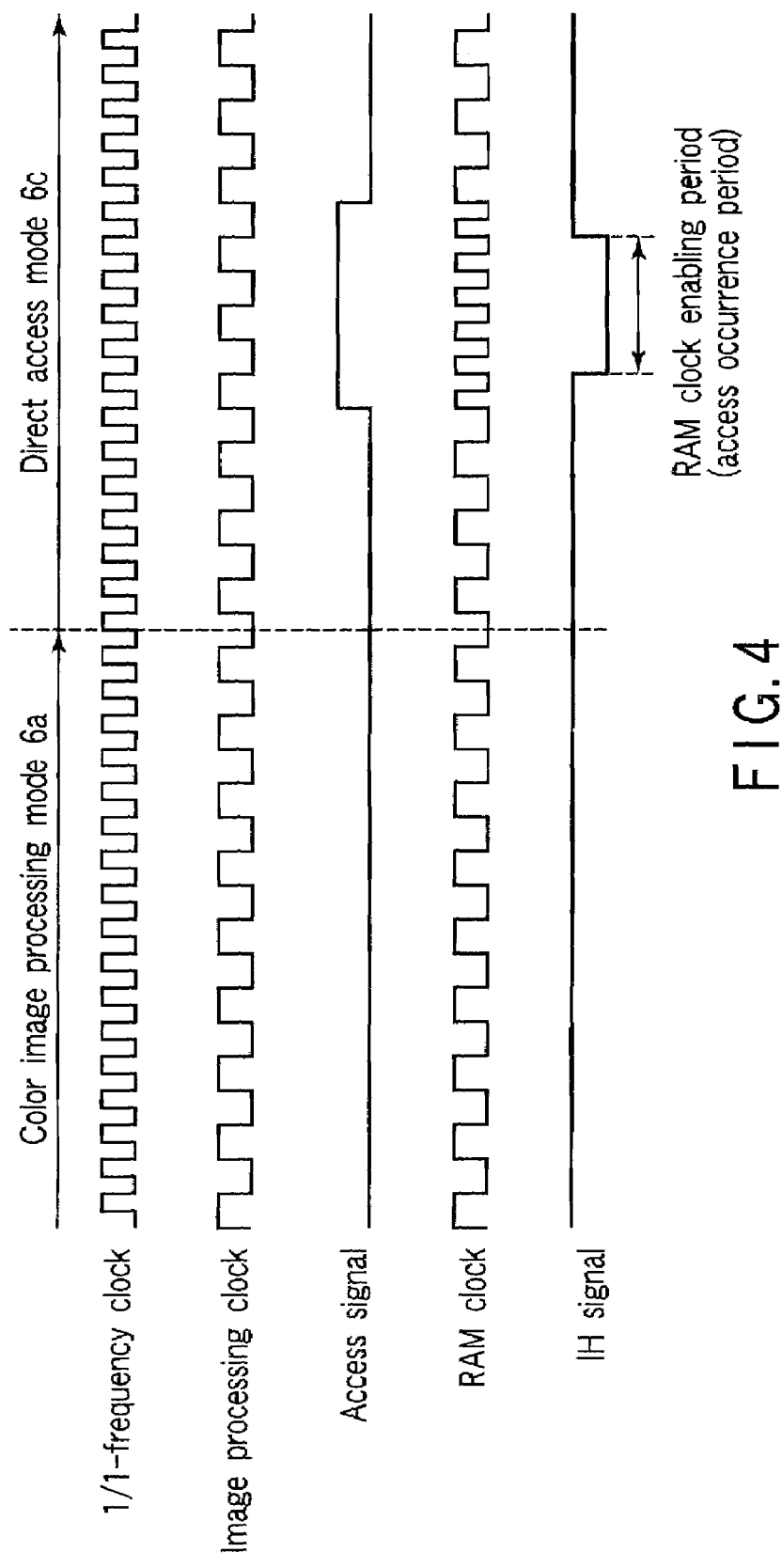
FIG. 4 is a timing chart illustrating the second embodiment.

As shown in FIG. 4, the clocks supplied to the RAM 68 are not switched immediately after the direct access mode 6c is set. In at least the RAM clock-enabled period in which the main CPU 1 accesses the RAM 68, the access signal is switched from "0" to "1" so that $\frac{1}{1}$-frequency clocks are supplied to the RAM 68. When the direct access mode 6c is set, the IH signal is temporarily switched to "1", thereby disabling the clocks supplied to the RAM 68.

After the access signal is switched to "1" and before the main CPU 1 executes direct access, the IH signal is switched to "0", thereby enabling the clocks supplied to the RAM 68. Then, the main CPU 1 accesses the RAM 68. After the end of the direct access by the main CPU 1, the IH signal is switched from "0" to "1" to disable the clocks supplied to the RAM 68. Thereafter, the access signal is switched from "1" to "0."

In the direct access mode 6c, the RAM clock-switching control section 66 switches at least input clocks from the $\frac{1}{2}$-frequency clocks to the $\frac{1}{1}$-frequency clocks in the RAM clock-enabled period when the main CPU 1 actually executes direct access to the RAM 68. In addition, the IH signal is switched to an enabling state in the RAM clock-enabled period.

With the above configuration of the RAM clock-switching control section 66, the RAM 68 can be operated based on fast clocks in the direct access mode 6c though it operates in the image processing mode based on clocks that are slow in terms of the operation of the RAM 68. As a result, the processing efficiency of the entire digital color copying machine can be enhanced, including that of the ASIC 6.

Third Embodiment

The third embodiment will be described. Similar or corresponding structural elements to those described in connection with the first embodiment will be denoted by the same reference numerals as used above, and a detailed description of such structural elements will be omitted.

Figure 5:
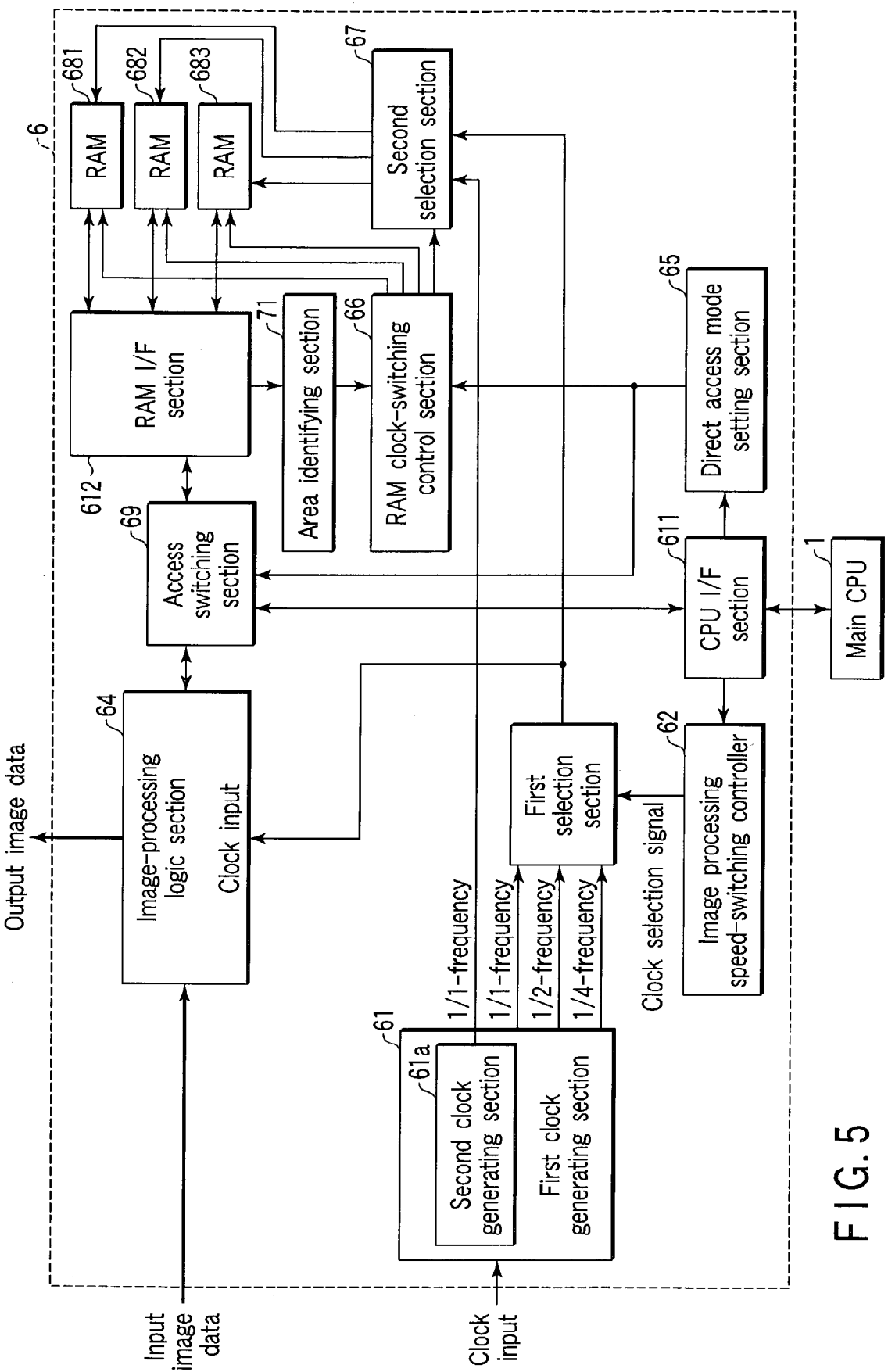
FIG. 5 schematically illustrates the ASIC employed in the third embodiment.

Features that are not included in the first embodiment will be described, referring to FIG. 5. In place of the RAM 68, a number of address areas, namely RAM 681, RAM 682 and RAM 683, are provided. Each of these RAMs 681, 682 and 683 is connected to a RAM I/F section 612, a RAM clock-switching control section 66 and a second selection section 67. An area identifying section 71 is provided between the RAM I/F section 612 and the RAM clock-switching control section 66. The area identifying section 71 is connected to a direct access mode setting section 65 through the RAM I/F section 612 and an access switching section 69. Based on the information supplied from the direct access mode setting section 65, the area identifying section 71 determines which address area of the RAM is accessed by the main CPU 1. A determination signal, which represents the result of the determination, is supplied to the RAM clock-switching control section 66. Based on the RAM clock section signal from the direct access mode setting section 65 and the determination signal from the area identifying section 71, the RAM clock-switching control section 66 determines which RAM should be accessed in the direct access mode 6c, then determines the RAM clock switching period, and then switches the IH signal.

A RAM681 clock selection signal is supplied from the RAM clock-switching control section 66 to the second selection section 67, and a RAM681 IH signal to the RAM 681. A RAM 681 clock is supplied from the second selection section 67 to RAM 681. In addition, a RAM 682 clock selection signal is supplied from the RAM clock-switching control section 66 to the second selection section 67, and a RAM682 IH signal to RAM 682. A RAM682 clock is supplied from the second selection section 67 to RAM 682. Further, a RAM683 clock selection signal is supplied from the RAM clock-switching control section 66 to the second selection section 67, and a RAM683 IH signal to RAM 683. A RAM683 clock is supplied from the second selection section 67 to RAM 683.

An operation of the RAM clock-switching control section 66 of the ASIC 6 of the above configuration will now be described with reference to the timing chart shown in FIG. 6.

Figure 6:
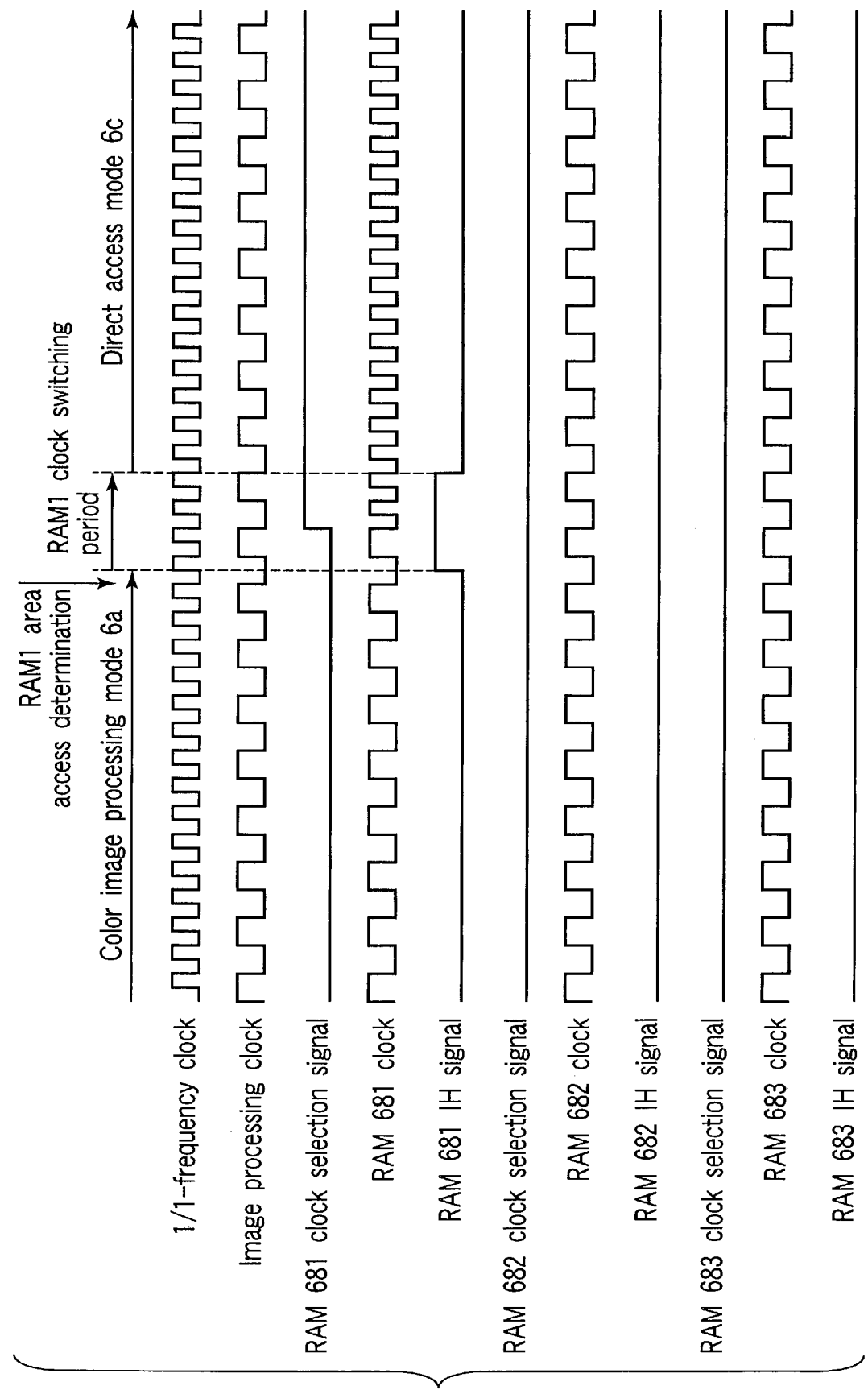
FIG. 6 is a timing chart illustrating the third embodiment.

Time (T) is plotted against the abscissa of FIG. 6, and what are shown in FIG. 6 from top to bottom are a $\frac{1}{1}$-frequency clock and an image processing clock. FIG. 6 illustrates the timings among RAM clock selection signals corresponding to RAMs 681, 682 and 683, RAM clocks, and IH signals. The timing chart in FIG. 6 illustrates timings at which the main CPU 1 accesses the RAM 681 in the direct access mode 6c that is set in the color image processing mode 6a.

When the RAM clock-switching control section 66 receives a determination signal allowing access to the RAM 681 from the area identifying section 71, the RAM681 IH signal changes from "0" to "1", disabling the clocks supplied to the RAM 681. The RAM681 clock selection signal corresponding to RAM 681 is switched, and $\frac{1}{1}$-frequency clocks are supplied to the RAM 681. After the elapse of the RAM clock switching period, the RAM681 IH signal changes from "1" to "0", thereby enabling the clocks supplied to the RAM 681. In this manner, the main CPU 1 accesses the RAM 681 based on the $\frac{1}{1}$-frequency clocks, which are fastest in terms of the operation of the RAM 681. Since the main CPU 1 does not access the RAM 682 or RAM 683 then, the IH signals and RAM clock selection signals corresponding to them are "0."

The above configuration is advantageous in that where there are RAMs 681, 682 and 683 to be accessed, the RAM clock-switching control section 66 of the ASIC 6 enables fast clocks to be supplied only to the RAM which the main CPU 1 accesses in the direct access mode 6c. The power consumption can be reduced by using fast clocks for only the RAM being directly accessed. It should be also noted that the third embodiment attains similar advantages to those of the first embodiment.

Fourth Embodiment

The fourth embodiment will be described. Similar or corresponding structural elements to those described in connection with the first embodiment will be denoted by the same reference numerals as used above, and a detailed description of such structural elements will be omitted.

Figure 7:
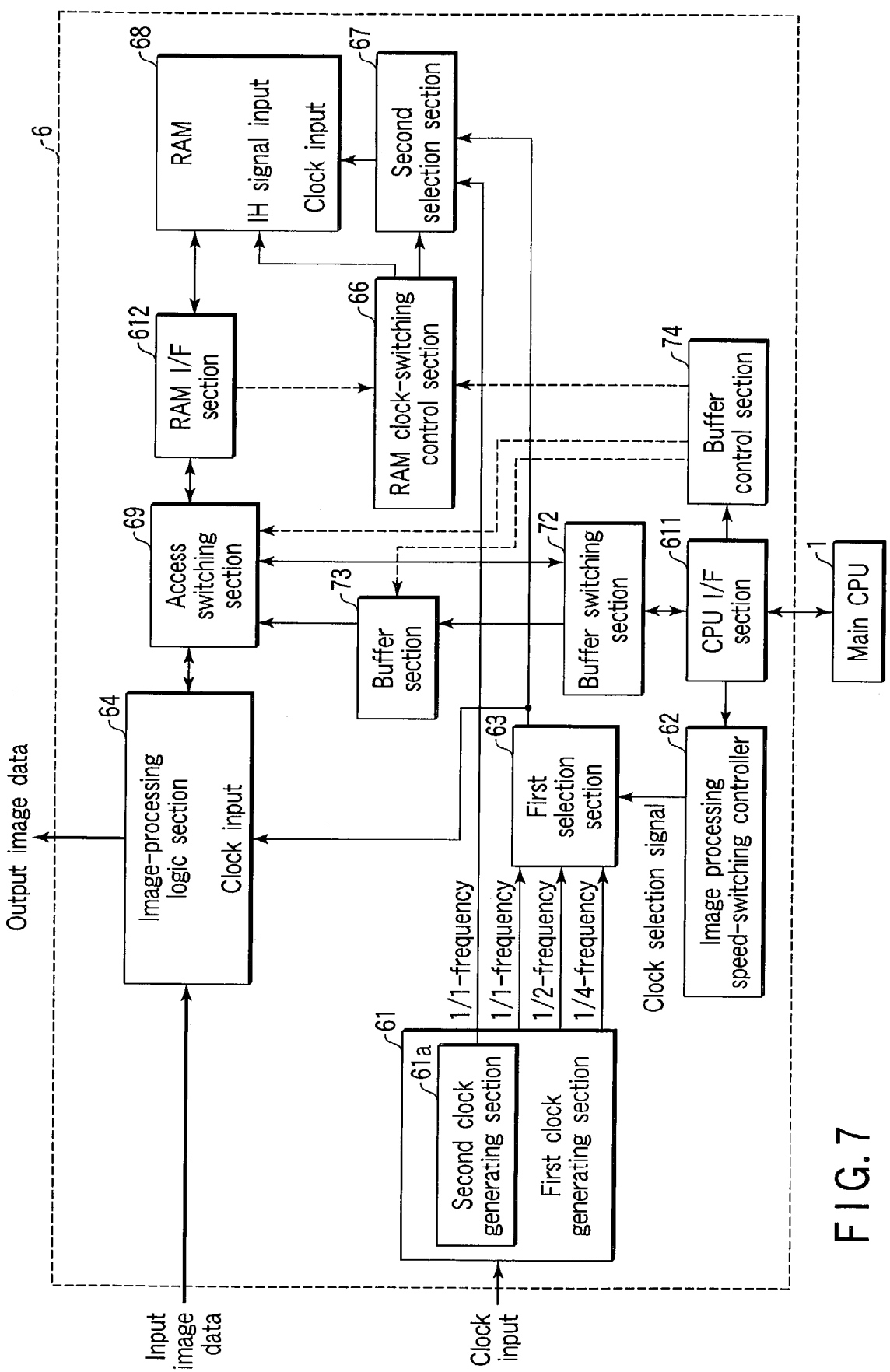
FIG. 7 schematically illustrates the ASIC employed in the fourth embodiment.

Features that are not included in the first embodiment will be described, referring to FIG. 7. A buffer switching section 72 is provided between a CPU I/F section 611 and an access switching section 69. A buffer section 73 configured to temporarily store data is provided between the buffer switching section 72 and the access switching section 69. The direct access mode setting section 65 is replaced with a buffer control section 74. This buffer control section 74 is connected to a RAM clock-switching control section 66, as well as to the access switching section 69 and the buffer section 73.

Figure 8:
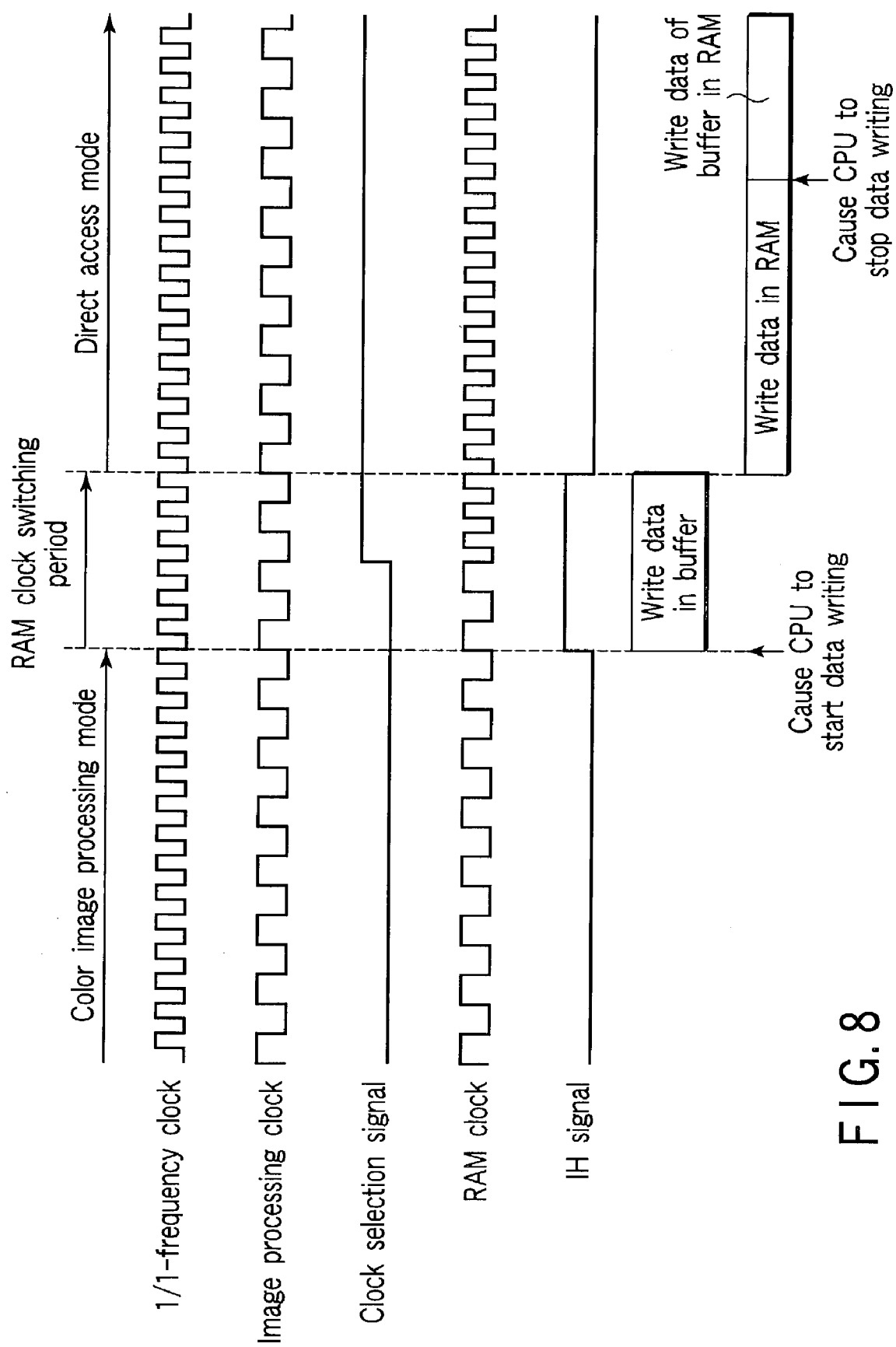
FIG. 8 is a timing chart illustrating the fourth embodiment.

Upon receipt of an instruction for starting the direct access mode 6c (in which the main CPU 1 directly writes data in the RAM 68), the buffer control section 74 makes preparations for writing the write data in the RAM 68. The control operation performed then will be described, referring to the timing chart shown in FIG. 8.

Upon receipt of an instruction for starting the direct access mode 6c, the buffer control section 74 first writes write data in the buffer section 73 and then outputs a signal for starting the direct access mode to the RAM clock-switching control section 66. When the write data is being written in the buffer section 73, the RAM clock-switching control section 66 generates an IH signal and a RAM clock selection signal so as to switch clocks supplied to the RAM 68. During the RAM clock switching period in which this switching control is executed, the IH signal is "1", so that write data is not written in the RAM 68 but accumulated in the buffer section 73. When the RAM clock switching period elapses and the buffer control section 74 detects the state wherein access to the RAM 68 is possible, the buffer control section 74 stops writing the write data in the buffer section 73. Then, the buffer control section 74 controls the access switching section 69 and the buffer switching section 72 in such a manner that the main CPU 1 and the RAM 68 are connected, and starts writing the write data directly in the RAM 68. Upon detection of the end of the operation of writing the write data, the buffer control section 74 connects the access switching section 69 to the buffer section 73 and writes the write data stored in the buffer section 73 in the RAM 68. When the write data stored in the buffer section 69 has been written, the buffer control section 74 connects the access switching section 69 to the image-processing logic section 64 and performs control in such a manner that the RAM clock switching control section 66 generates a RAM clock selection signal that calls for clocks used in the color image processing mode 6a. The control timings are similar to those illustrated in FIG. 3.

With the configuration described above, the buffer control section 74 performs control operations, such as the switching performed by the RAM clock switching control section 66 and the buffer switching section 72. Hence, the write data can be written in the RAM 68 by direct access. Since the main CPU 1 need not perform the switching control, data can be written in the direct access mode with higher efficiency.

Fifth Embodiment

The fifth embodiment will be described. Similar or corresponding structural elements to those described in connection with the first embodiment will be denoted by the same reference numerals as used above, and a detailed description of such structural elements will be omitted.

Features that are not included in the first embodiment will be described, referring to FIG. 9. The fifth embodiment employs a switching period determination section 75 that detects a subscan-direction video enabling signal (hereinafter referred to as "VDEN signal") from the signals supplied from the image-processing logic section 64. When the color scanner section 4 is reading images from a plurality of documents, the VDEN signal indicates the region between pages. For example, the VDEN signal is "0" during the period when page processing is being executed, and is "1" during the period corresponding to the region between pages. Since the image-processing logic section 64 does not perform image processing during the period corresponding to the region between pages, the main CPU 1 can make use of this period for direct access. In such a case, the switching period determination section 75 is connected to the main CPU 1 through the RAM clock switching control section 66, the access switching section 69 and the CPU I/F section 611.

Figure 10:
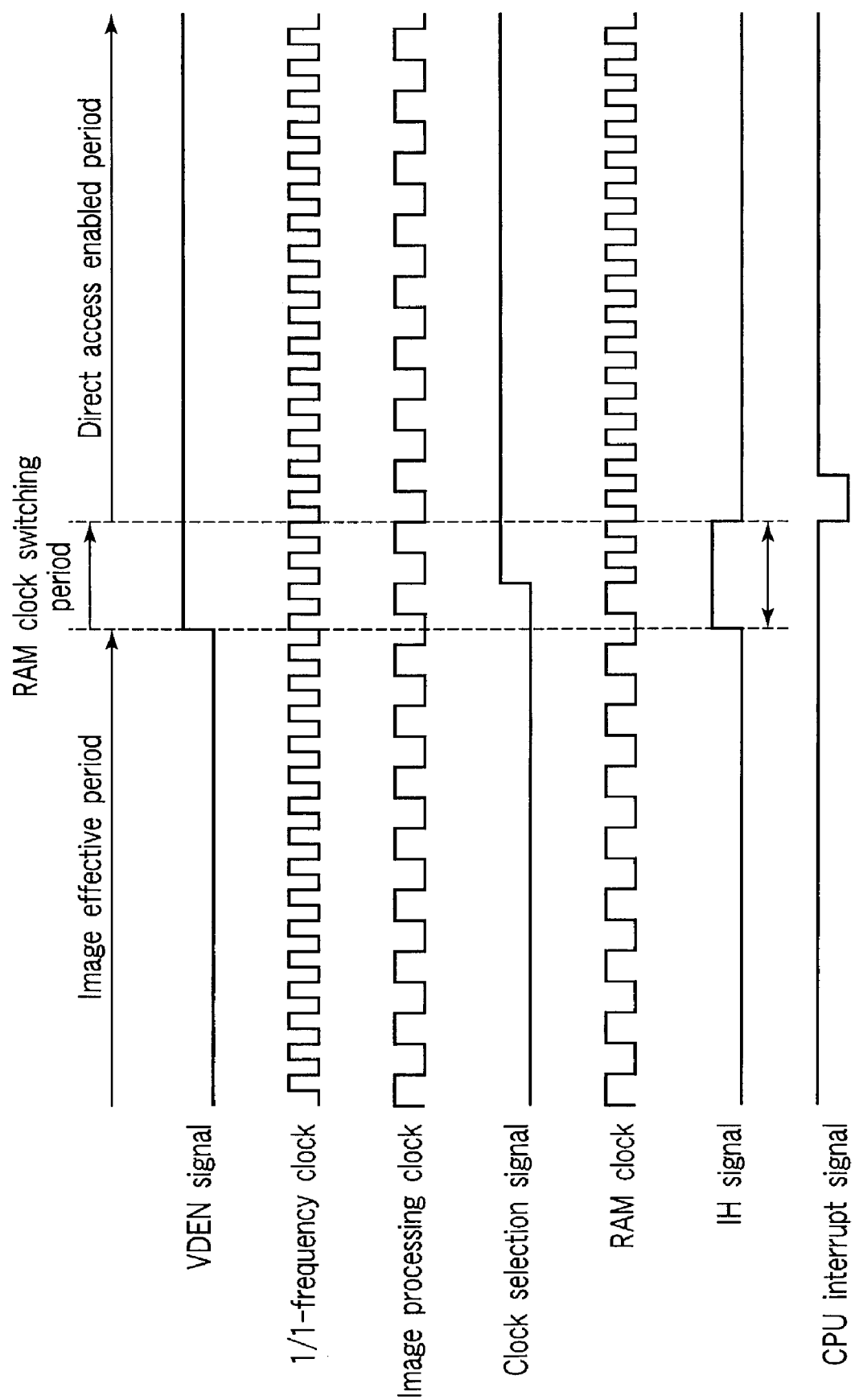
FIG. 10 is a timing chart illustrating the fifth embodiment.

An operation of the ASIC 6 will be described, referring to the timing chart shown in FIG. 10. When the switching period determination section 75 detects that the VDEN signal supplied from the image-processing logic section 64 changes from "0" to "1", the RAM clock switching control section 66 is supplied with a signal that selects the direct access mode 6c. Upon receipt of this signal, the RAM clock switching control section 66 generates an IH signal and a RAM clock selection signal, for switching the clocks supplied to the RAM 68. When the RAM clock switching period elapses after the switching control, direct access from the main CPU 1 is enabled. Accordingly, the switching period determination section 75 connects the access switching section 69 to the main CPU 1. An interrupt signal, which interrupts the main CPU 1, is lowered to "0" from "1" so as to indicate that direct access is enabled. A predetermined time after that, the interrupt signal is raised to "1" from "0", so as to allow the main CPU 1 to execute direct access.

When the switching period determination section 75 detects that the VDEN signal has fallen, the RAM clock switching control section 66 is supplied with a signal that cancels the setting of the direct access mode 6c. After the elapse of the RAM clock switching period, the switching period determination section 75 connects the access switching section 69 to the image-processing logic section 64 and supplies the main CPU 1 with a signal indicating that direct access has been disabled. Thereafter, the original image processing mode is set again.

With the above configuration of the ASIC 6, the RAM can be operated based on fast clocks in the direct access mode though it operates in the image processing mode based on clocks that are slow in terms of the operation of the RAM 68. As a result, the processing efficiency of the entire digital color copying machine can be enhanced, including that of the ASIC 6.

Sixth Embodiment

The sixth embodiment will be described. Similar or corresponding structural elements to those described in connection with the first embodiment will be denoted by the same reference numerals as used above, and a detailed description of such structural elements will be omitted.

Figure 11:
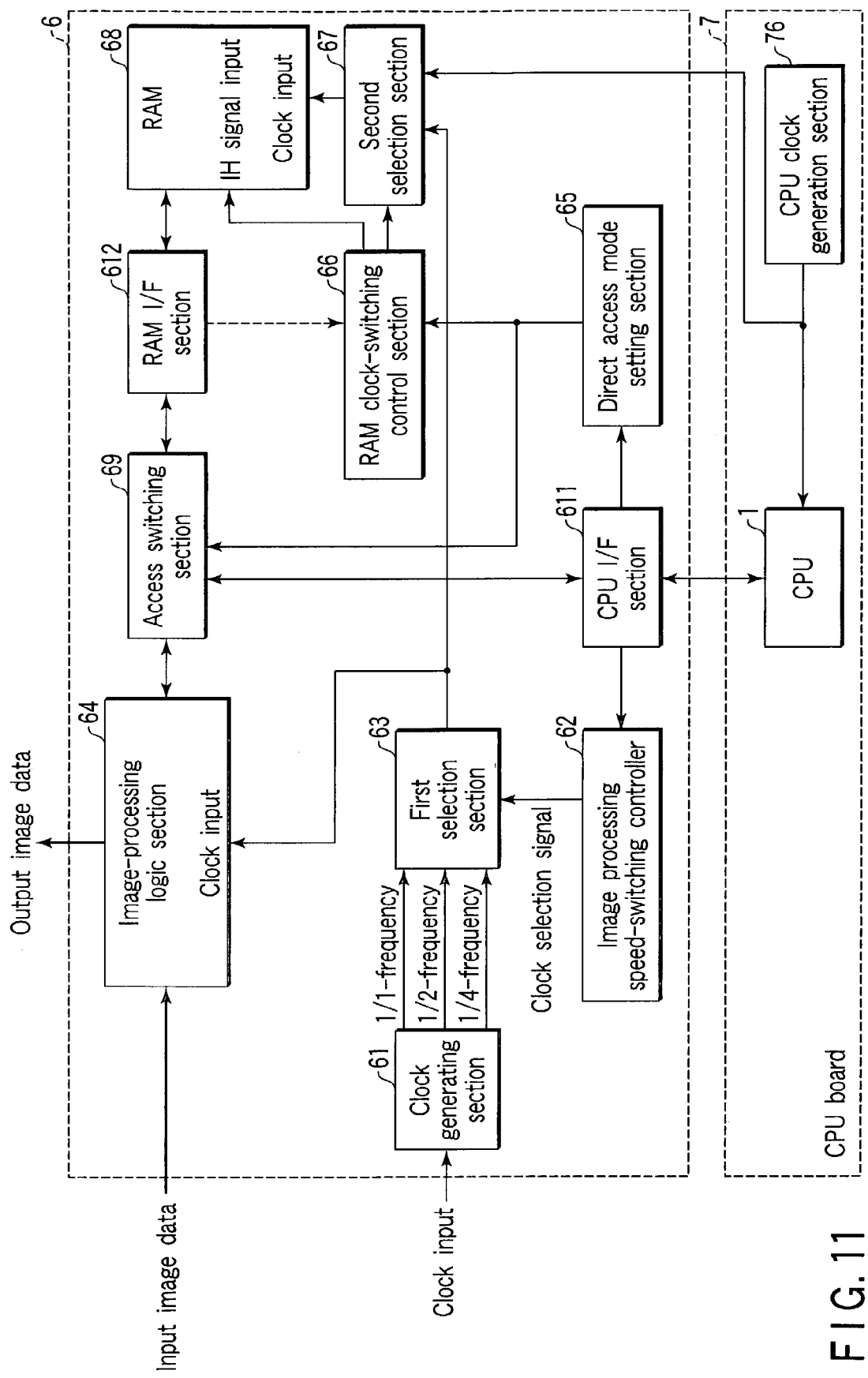
FIG. 11 schematically illustrates the ASIC employed in the sixth embodiment.

Features that are not included in the first embodiment will be described, referring to FIG. 11. The clocks used for operating a RAM at high speed are supplied to a second selection section (also functioning as a clock receiving section) from a CPU clock generation section 76 (i.e., a second clock generation section), which is mounted on the same CPU board 7 as the main CPU 1.

When the direct access mode 6c is selected in each image processing mode, the RAM clock switching control section 66 can select either the clocks selected by the first selection section 63 or the clocks received from the CPU clock generation section 76, and supplies the selected clocks from the second selection section 67 to the RAM 68.

With the above configuration, the same clocks as those supplied to the main CPU 1 can be supplied to the RAM 68 in the case where the RAM 68 and the main CPU 1 can operate at the same speed. As a result, the efficiency of the direct access can be further improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:
    an image processing section configured to execute image processing in an image processing mode that accords with input image data;
    a storage section configured to be used for the image processing by the image processing section;
    a first clock generating section configured to generate a plurality of clocks based on which the image processing section and the storage section operate in the image processing mode;
    a first switch control section configured to select clocks which accord with the image processing mode from the plurality of clocks and use selected clocks for the image processing section and the storage section, which operate on equal clocks;
    a second clock generating section configured to generate clocks which are faster than the clocks generated by the first clock generating section in accordance with an operation of the storage section;
    a direct access mode setting section configured to determine settings for a direct access mode in which direct access to the storage section is externally executed;
    a second switch control section configured to switch the clocks for operating the storage section from the clocks selected by the first switch control section to the clocks generated by the second clock generating section, when the direct access mode setting section sets the direct access mode;
    a buffer section configured to temporarily store data externally input in the direct access mode;
    a buffer switching section configured to switch the direct access between the buffer section and the storage section; and
    a buffer control section configured to switch the buffer switching section such that the data is written in the buffer section before the clocks supplied to the storage section stabilize and is written in the storage section after the clocks stabilize, and such that the data in the buffer section is written in the storage section after the data is written in the storage section.

2. An image processing system according to claim 1, wherein the second switch control section is configured to disable the clocks for operation of the storage section in response to clock switching and is configured to keep the clocks disabled until the clocks stabilize.

3. An image processing system according to claim 1, wherein the second switch control section is configured to switch clocks from the clocks generated by the second clock generation section to the clocks selected by the first switch control section when the direct access mode ends.

4. An image processing system according to claim 1, wherein the storage section includes a plurality of areas, and wherein the system further comprises:
    an area determination section configured to determine which one of the areas should be accessed in the direct access mode set by the direct access mode setting section.

5. An image processing method comprising:
    executing, with an image processing section, image processing in an image processing mode that accords with input image data;
    storing, with a storage section, the image processing by the image processing section;
    generating, with a first clock generating section, a plurality of clocks based on which the image processing section and the storage section operate in the image processing mode;
    selecting, with a first switch control section, clocks which accord with the image processing mode from the plurality of clocks;
    using, with the first switch control section, selected clocks for the image processing section and the storage section, which operate on equal clocks;
    generating, with a second clock generating section, clocks which are faster than the clocks generated by the first clock generating section in accordance with an operation of the storage section;
    determining, with a direct access mode setting section, settings for a direct access mode in which direct access to the storage section is externally executed;
    switching, with a second switch control section, the clocks for operating the storage section from the clocks selected by the first switch control section to the clocks generated by the second clock generating section, when the direct access mode setting section sets the direct access mode;
    temporarily storing, with a buffer section, data externally input in the direct access mode;
    switching, with a buffer switching section, the direct access between the buffer section and the storage section; and
    switching, with a buffer control section, the buffer switching section such that the data is written in the buffer section before the clocks supplied to the storage section stabilize and is written in the storage section after the clocks stabilize, and such that the data in the buffer section is written in the storage section after the data is written in the storage section.

6. An image processing method according to claim 5, wherein the second switch control section disables the clocks for operation of the storage section in response to clock switching and keeps the clocks disabled until the clocks stabilize.

7. An image processing method according to claim 5, wherein the second switch control section switches clocks from the clocks generated by the second clock generation section to the clocks selected by the first switch control section when the direct access mode ends.

8. An image processing method according to claim 5, wherein the storage section includes a plurality of areas, and wherein the method further comprises the step of:
    determining, with an area determination section, which one of the areas should be accessed in the direct access mode set by the direct access mode setting section.

* * * * *